US012416892B2

(12) United States Patent
Yoshimoto

(10) Patent No.: US 12,416,892 B2
(45) Date of Patent: Sep. 16, 2025

(54) CONTROL BOARD CONFIGURATION IN AN IMAGE FORMING APPARATUS

(71) Applicant: CANON KABUSHIKI KAISHA, Tokyo (JP)

(72) Inventor: Tetsuhiro Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 18/514,921

(22) Filed: Nov. 20, 2023

(65) Prior Publication Data

US 2024/0192629 A1 Jun. 13, 2024

(30) Foreign Application Priority Data

Dec. 8, 2022 (JP) ................................ 2022-196071

(51) Int. Cl.
*G03G 15/00* (2006.01)
*G03G 21/16* (2006.01)

(52) U.S. Cl.
CPC ......... *G03G 15/80* (2013.01); *G03G 21/1652* (2013.01)

(58) Field of Classification Search
USPC ........................................................... 399/90
See application file for complete search history.

(56) References Cited

FOREIGN PATENT DOCUMENTS

JP 2021-184029 A 12/2021

OTHER PUBLICATIONS

Computer translation of cited reference JP2021-184029A to Hayayumi (Year: 2021).*

* cited by examiner

*Primary Examiner* — Quana Grainger
(74) *Attorney, Agent, or Firm* — Canon U.S.A., Inc., IP Division

(57) ABSTRACT

An image forming apparatus includes a drive unit, a drive control board, a first unit, a second unit, a first cable, and a second cable. The drive unit is detachably attached to the image forming apparatus. The drive control board is disposed on a back surface side of the drive unit and controls the drive unit. The first cable is electrically connect the first unit and the drive control board. The second cable is electrically connect the second unit and the drive control board. The drive control board includes a first connector to which the first cable is connected, a second connector to which the second cable is connected, and a wiring electrically connect the first connector and the second connector.

8 Claims, 6 Drawing Sheets

CONTROL BOARD CONFIGURATION IN AN IMAGE FORMING APPARATUS

BACKGROUND

Field

The present disclosure relates to an image forming apparatus such as a copying machine, a laser printer, or a facsimile machine adopting an electrophotographic system.

Description of the Related Art

In an image forming apparatus such as a copying machine or a printer, a drive unit, a control board that controls the drive unit, and the like are collectively disposed on a back surface side of the image forming apparatus because a frequency of maintenance such as replacement or cleaning is low as compared with a photosensitive drum that forms an image, a developing device, and the like. Japanese Patent Laid-Open No. 2021-184029 discloses a control board that is disposed on a drive unit disposed at the center on a back surface side of an image forming apparatus.

In a configuration according to the related art a drive unit for driving a photosensitive drum is ideally detachably attachable to an image forming apparatus together with a control board that controls the drive unit from the viewpoint of maintainability by service engineers.

However, in the configuration according to the related art, a bundle of wires of a non-maintenance-target unit may pass on a maintenance target unit as an electric path. In this case, it is necessary to access the maintenance target unit after accessing the non-maintenance-target unit and removing the bundle of wires passing on the maintenance target unit. For example, it is necessary to remove a bundle of wires passing on the drive unit when removing the drive unit from the image forming apparatus, which deteriorates workability at the time of maintenance.

SUMMARY

According to an aspect of the present disclosure, an image forming apparatus includes a drive unit detachably attached to the image forming apparatus, a drive control board disposed on a back surface side of the drive unit and configured to control the drive unit, a first unit, a second unit, a first cable configured to electrically connect the first unit and the drive control board, and a second cable configured to electrically connect the second unit and the drive control board, wherein the drive control board includes a first connector to which the first cable is connected, a second connector to which the second cable is connected, and a wiring configured to electrically connect the first connector and the second connector.

Further features of the present disclosure will become apparent from the following description of exemplary embodiments with reference to the attached drawings.

DESCRIPTION OF THE EMBODIMENTS

Hereinafter, embodiments of the present disclosure will be exemplarily described in detail with reference to the drawings. Note that dimensions, materials, shapes, relative arrangements, and the like of components described in the following embodiments can be appropriately modified or changed and are not intended to limit the scope of the present disclosure.

First Embodiment

Figure 1:
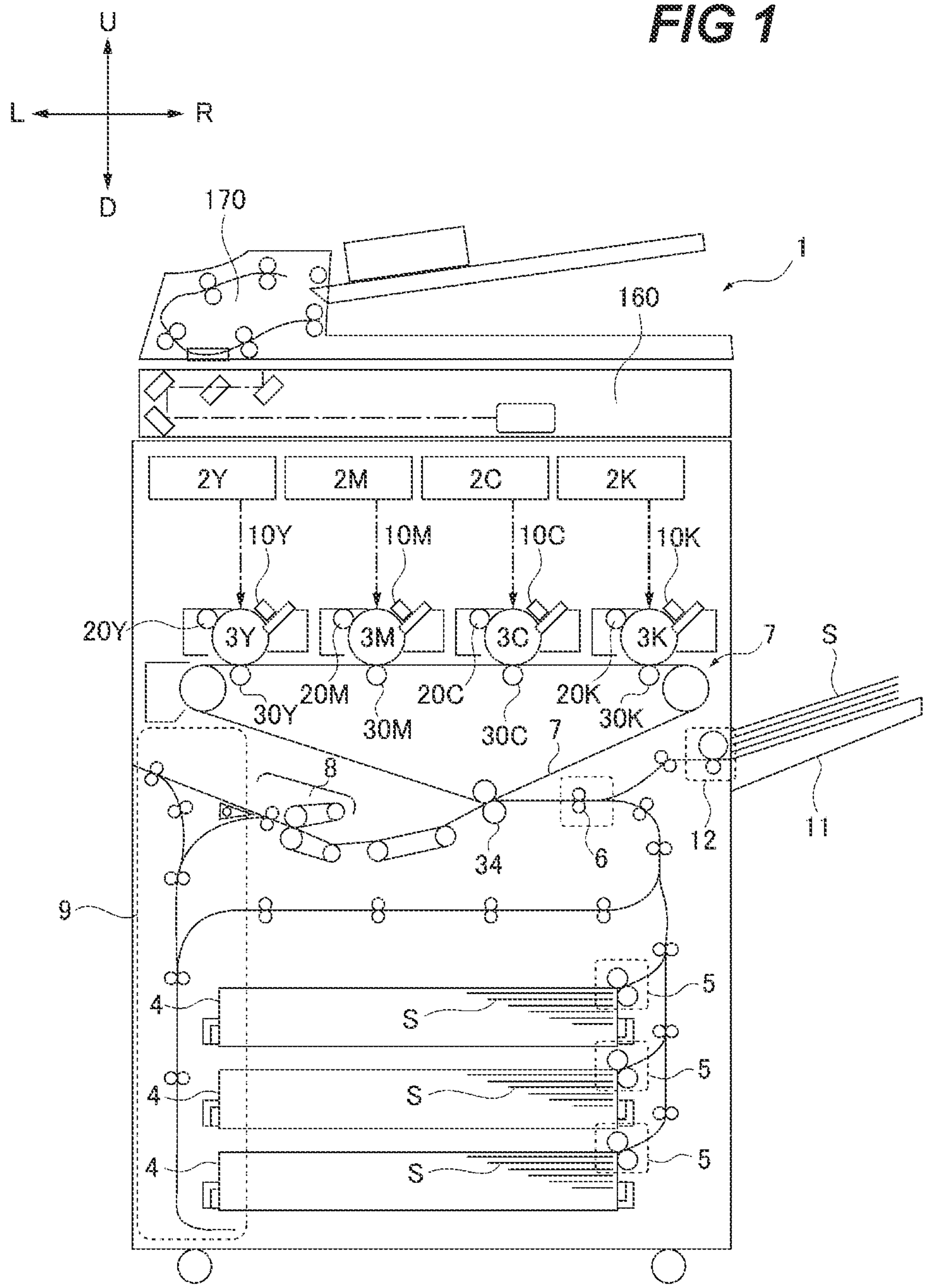
FIG. 1 is a schematic cross-sectional view of an image forming apparatus.

FIG. 1 is a schematic cross-sectional view of an image forming apparatus.

An image forming apparatus 1 illustrated in FIG. 1 is, for example, a copying machine including an original feeding device 170 that feeds an original to be read and a reading device 160 that reads an image of the original. However, the image forming apparatus is not limited thereto, and may be another image forming apparatus such as a printer not including a reading device.

The image forming apparatus 1 illustrated in FIG. 1 has, for example, a configuration using an intermediate transfer tandem system in which four image forming portions that form toner images of respective colors of yellow, magenta, cyan, and black are arranged side by side on an intermediate transfer member. However, the image forming apparatus is not limited to a color image forming apparatus including a plurality of photosensitive drums 3 as illustrated in FIG. 1, and may be a color image forming apparatus including one photosensitive drum or an image forming apparatus that forms a monochrome image.

First, an outline of an operation of the image forming apparatus 1 will be described with reference to FIG. 1.

In the image forming apparatus 1 illustrated in FIG. 1, photosensitive drums 3Y, 3M, 3C, and 3K, which are photoreceptors (rotating members) of respective colors of yellow (Y), magenta (M), cyan (C), and black (K), are rotatably provided in the image forming portions, respectively. In the following description, Y, M, C, and K denoted by reference numerals indicate toner colors.

In the respective image forming portions, the photosensitive drums 3Y, 3M, 3C, and 3K are uniformly charged by primary charging devices 10Y, 10M, 10C, and 10K, respectively. The charged photosensitive drums 3Y, 3M, 3C, and 3K are exposed with light modulated according to an information signal by exposure devices 2Y, 2M, 2C, and 2K, so that electrostatic latent images are formed.

The latent images formed on the photosensitive drums 3Y, 3M, 3C, and 3K are visualized as toner images by yellow, magenta, cyan, and black toners in the developing devices 20Y, 20M, 20C, and 20K, respectively.

The visualized toner images of the respective colors are transferred by primary transfer rollers 30Y, 30M, 30C, and 30K in such a way as to be superimposed on an intermediate transfer member 7*a* of an intermediate transfer unit 7. The intermediate transfer member 7*a* is an endless belt. The intermediate transfer unit 7 includes a plurality of rollers such as drive rollers and the primary transfer rollers 30Y, 30M, 30C, and 30K, and the intermediate transfer member 7*a* wound around the rollers.

On the other hand, sheets S, which are recording materials stored in a cassette 4, are fed one by one by a feeding unit 5 including a feed roller, and are conveyed to a nip portion (secondary transfer portion) between a secondary transfer roller 34 and the intermediate transfer member 7*a* at a predetermined timing by a registration roller 6.

Alternatively, the sheets S, which are recording materials set on a manual feed tray 11, are fed one by one by a manual feeding unit 12 including a manual feed roller, and are conveyed to the nip portion (secondary transfer portion) between the secondary transfer roller 34 and the intermediate transfer member 7*a* at a predetermined timing by the registration roller 6.

Then, the toner images transferred onto the intermediate transfer member 7*a* are transferred to the sheet S by the secondary transfer roller 34. The toner images transferred to the sheet S are fixed to the sheet S by a fixing unit 8. The sheet S on which the images are fixed is discharged by a reverse discharge unit 9 including a discharge roller.

Figure 4:
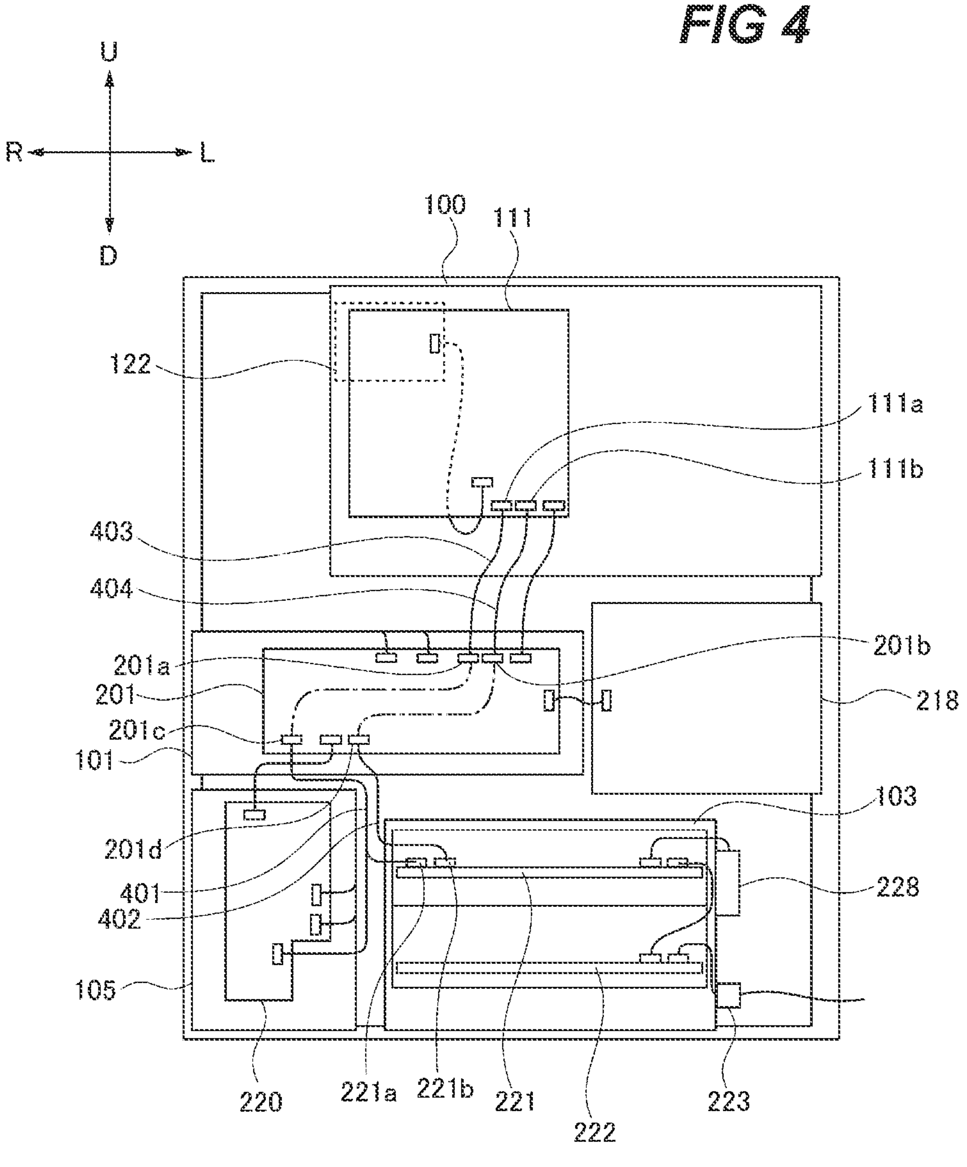
FIG. 4 is a diagram illustrating an electrical arrangement configuration of a main drive unit according to a first embodiment.
Figure 6:
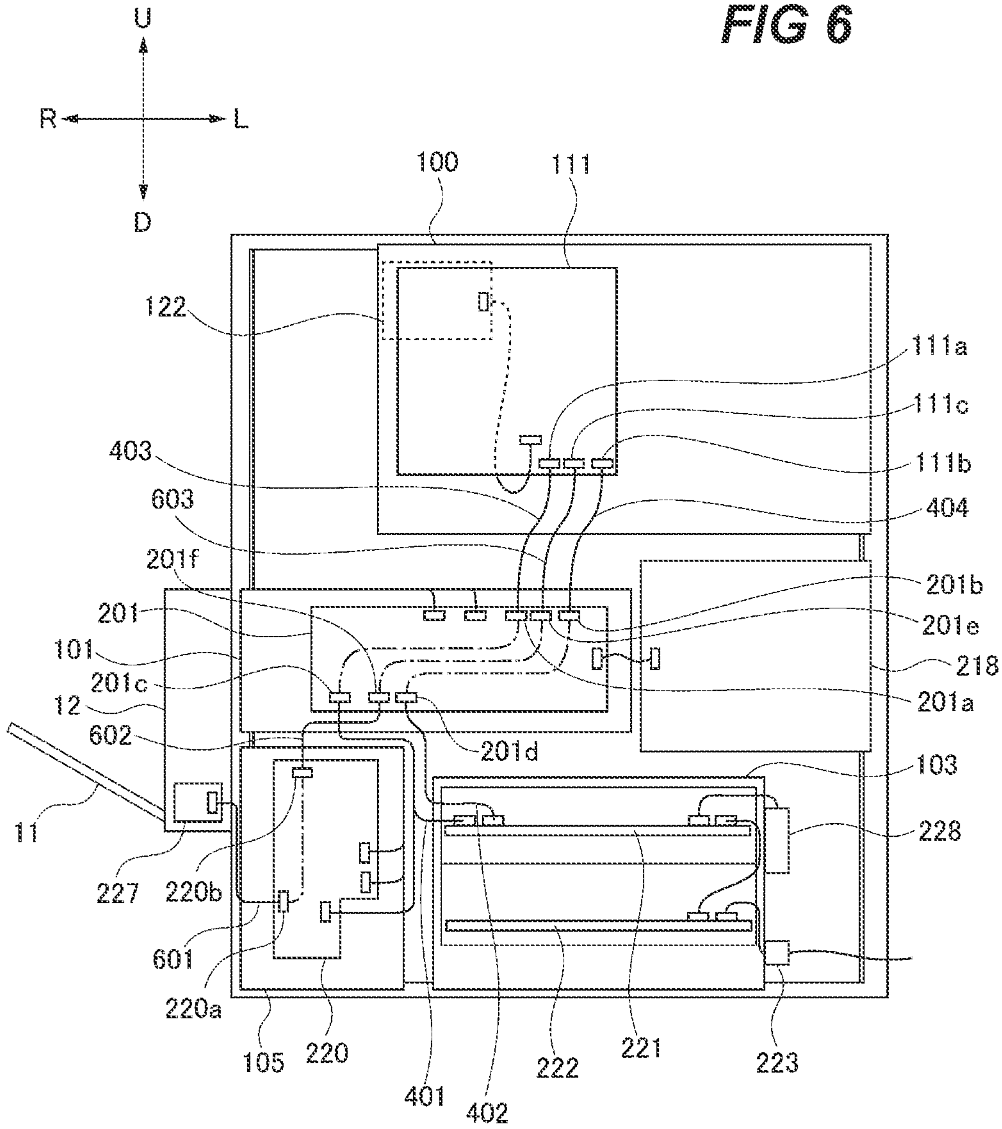
FIG. 6 is a diagram illustrating an electrical arrangement configuration of a feed drive unit according to a second embodiment.

FIG. 1 illustrates a front side of the image forming apparatus 1. On the other hand, FIG. 4 illustrates a rear side (back side or back surface side) of the image forming apparatus 1 illustrated in FIG. 1 that is opposite to the front side. The sides illustrated in the drawings are defined as the front side (front surface side) of the image forming apparatus 1 and the rear side (back side or back surface side) of the image forming apparatus 1, respectively. In the image forming apparatus 1 illustrated in FIG. 1, when the photosensitive drum 3K on which the electrostatic latent image related to the black toner image is formed is used as a reference, a side on which the photosensitive drum 3Y on which the electrostatic latent image related to the yellow toner image is formed is disposed is defined as a left side. When the photosensitive drum 3Y on which the electrostatic latent image related to the yellow toner image is formed is used as a reference, a side on which the photosensitive drum 3K on which the electrostatic latent image related to the black toner image is formed is disposed is defined as a right side. Furthermore, a top direction in a vertical direction that is perpendicular to a front-rear direction and a left-right direction defined here is defined as a top direction, and a bottom direction in the vertical direction that is perpendicular to the front-rear direction and the left-right direction defined here is defined as a bottom direction. A right direction R, a left direction L, a top direction U, and a bottom direction D, excluding the defined front direction and rear direction, are illustrated in FIGS. 1, 4, and 6.

Figure 2:
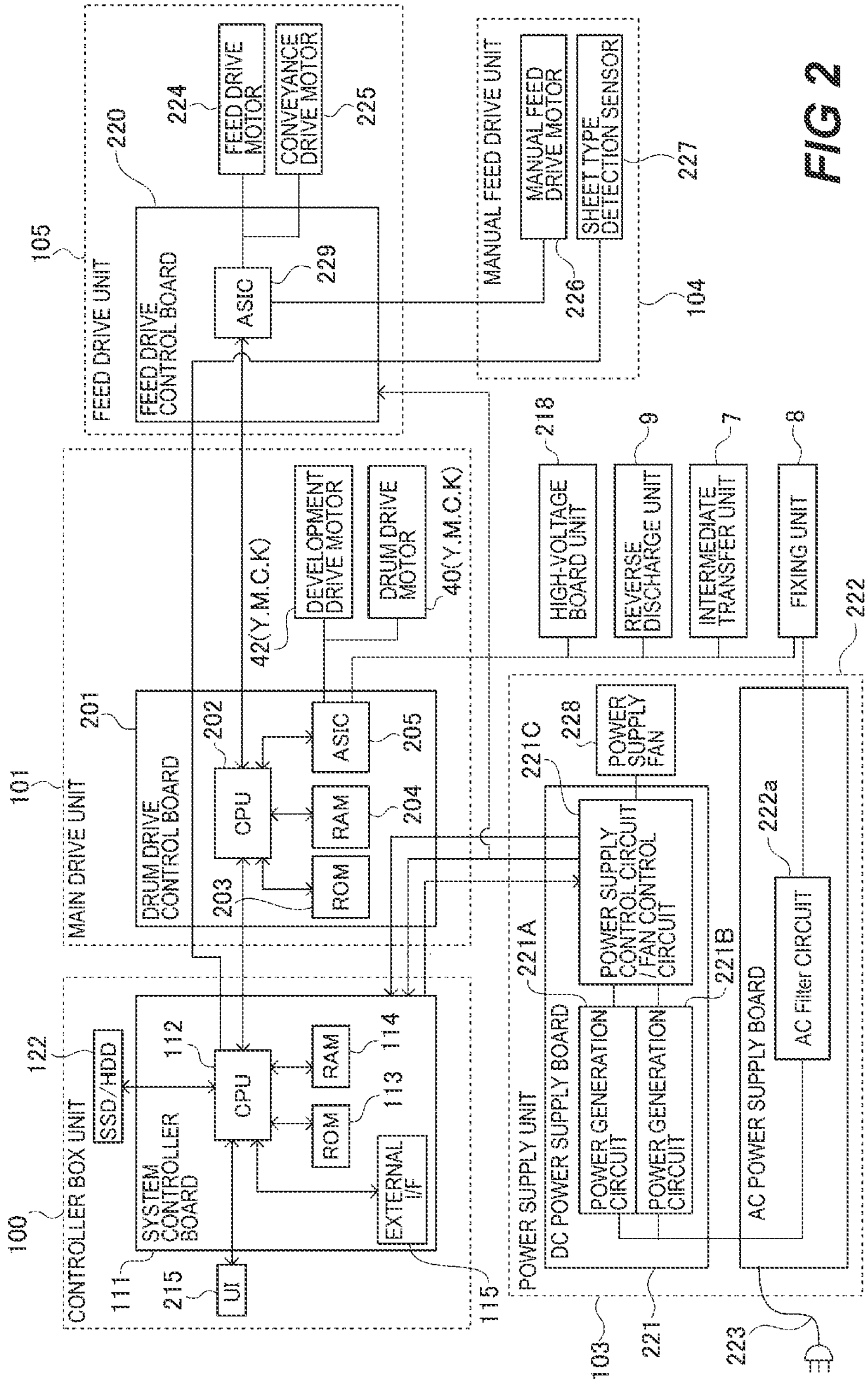
FIG. 2 is a block diagram of an electrical system.

Next, in the image forming apparatus 1 illustrated in FIG. 1, an electrical system that is disposed on the back surface side of the image forming apparatus 1 and controls an operation of the image forming apparatus 1 will be described with reference to a block diagram illustrated in FIG. 2.

A system controller board 111 that integrally controls the entire apparatus serves as the center of control. The system controller board 111 includes an operation portion (user interface (UI)) 215 and an external I/F (input/output circuit) 115 that receives and outputs a signal from and to the outside. The operation portion (UI) 215 includes a key, an operation panel, or the like for inputting information to the image forming apparatus 1, and is disposed on the front surface side (front side) of the image forming apparatus 1. The system controller board 111 processes image data input from the outside according to an instruction from the operation portion (UI) 215, and performs exposure data conversion for the photosensitive drums 3Y, 3M, 3C, and 3K of the respective colors.

The system controller board 111 includes a central processing unit (CPU) 112, a read only memory (ROM) 113 that stores a program for controlling each portion, a random access memory (RAM) 114 that temporarily stores data, and the external I/F (input/output circuit) 115 that receives and outputs a signal from and to the outside.

The system controller board 111 is provided inside a controller box unit 100 together with a solid state drive (SSD)/hard disk drive (HDD) 122. The SSD/HDD 122 is a mass storage device for storing electronic data, and accompanying information of an image processing program, digital image data, and digital image data can be mainly accumulated in the SSD/HDD 122.

The controller box unit 100 including the system controller board 111 and the SSD/HDD 122 is disposed on the rear side of the image forming apparatus 1. The rear side of the image forming apparatus is a side opposite to the front side on which the operation portion is provided, in other words, the back surface side opposite to the front surface side of the image forming apparatus.

A main drive unit 101, a feed drive unit 105, a power supply unit 103, a manual feed drive unit 104, and the like are connected to the system controller board 111.

In the system controller board 111, the ROM 113 (storage portion) stores various programs related to control of the image forming apparatus 1 and various pieces of image data. The CPU 112 performs various types of arithmetic processing based on the control programs stored in the ROM 113. The RAM 114 temporarily stores data. That is, the CPU 112 controls each unit or the like connected to the system controller board 111 while using the RAM 114 as a work area based on the control program stored in the ROM 113, and executes the above-described image forming operation.

Meanwhile, control for image formation is performed by a main drive control board 201. The main drive control board 201 is disposed in the main drive unit 101, and is configured as a unit integrated with a drum drive motor 40 and a development drive motor 42.

The main drive control board 201 includes a CPU 202, a ROM 203 that stores a program for controlling each portion, a RAM 204 that temporarily stores data, and an application-specific integrated circuit (ASIC) 205 that is connected to a drive motor and each unit and performs control thereof.

Here, the main drive control board 201 is connected to a drive motor (drive source) that rotationally drives the image forming portion in the main drive unit 101, a sensor, or the like.

The main drive unit 101 includes a drive source that drives the rotating member, and the main drive control board 201 disposed in the main drive unit 101 controls the drive source. Specifically, the main drive unit 101 includes the drum drive motor 40 as a first drive source that drives the photosensitive drum 3 as the rotating member, the development drive motor 42 as a second drive source that drives the developing device 20 including a developing roller as the rotating member, and the like.

Therefore, in the main drive unit 101, the main drive control board 201 is connected to the drum drive motor 40 (40Y, 40M, 40C, and 40K) that rotationally drives the photosensitive drum 3, the development drive motor 42 (42Y, 42M, 42C, and 42K) that rotationally drives the developing device 20, and the like. The main drive control board 201 disposed in the main drive unit 101 controls the drum drive motor 40 and the development drive motor 42.

Further, the main drive control board 201 is connected to respective high-voltage boards in a high-voltage board unit 218 that generates a high voltage required in charging, developing, and transferring steps, and motors and sensors of conveyance units such as the intermediate transfer unit 7, the fixing unit 8, and the reverse discharge unit 9 by using a bundle of wires.

The main drive control board 201 is connected to a feed drive control board 220 disposed in the feed drive unit 105, and performs control of the sensors and motors used for sheet conveyance.

Further, the main drive control board 201 is also connected to a DC power supply board 221 of the power supply unit 103. The power supply unit 103 includes the DC power supply board 221 to which a power supply fan 228 is connected, and an AC power supply board 222 connected to the DC power supply board 221 and connected to a commercial power supply.

The DC power supply board 221 includes a power generation circuit 221A, a power generation circuit 221B, and a power supply control circuit/fan control circuit 221C to which the power supply fan 228 is connected.

The power generation circuit 221A is a power supply circuit for generating 12 V for operating the CPU 202 of the main drive control board 201, the CPU 112 of the system controller board 111, and the SSD/HDD 122. The power generation circuit 221B is a power supply circuit for generating 24 V for operating a drive load such as the development drive motor 42 or the drum drive motor 40. The power supply control circuit/fan control circuit 221C switches ON/OFF of output of the power generation circuit 221A and the power generation circuit 221B and performs switching to a power saving mode according to a command from the CPU 112 of the system controller board 111. In addition, the CPU 112 controls the image forming apparatus in such a way as to operate the power supply fan 228 for cooling the power supply at full speed or half speed, or to stop the power supply fan 228 according to an operation mode, and the power supply control circuit/fan control circuit 221C switches the operation mode of the fan according to a command from the CPU 112.

The AC power supply board 222 includes an AC filter circuit 222*a*.

The AC filter circuit 222*a* is a filter circuit for preventing noise intrusion of a commercial power supply and noise leakage of the image forming apparatus, and is formed by a common mode choke coil or a capacitor. Further, power after filtering is distributed to the DC power supply board 221 and the fixing unit 8.

In the power supply unit 103, the DC power supply board 221 converts AC power from the AC power supply board 222 connected to the commercial power supply through a power supply cable 223 into DC power, thereby generating necessary power. The generated power is supplied to the system controller board 111, the main drive control board 201, the feed drive control board 220, and the like.

The DC power supply board 221 of the power supply unit 103 is controlled by the system controller board 111. At the time of transition of the image forming apparatus 1 to the power saving mode or the like, a power output mode of the DC power supply board 221 and the operation mode of the power supply fan 228 for cooling the DC power supply board 221 are changed by a control signal from the system controller board 111.

Control for conveying the sheet S is performed by the feed drive control board 220. The feed drive control board 220 is disposed in the feed drive unit 105, and is configured as a unit integrated with a feed drive motor 224 and a conveyance drive motor 225. The feed drive control board 220 includes an ASIC 229 that is connected to the drive motors 224 and 225 and performs control thereof. The feed drive unit 105 includes the feed drive motor 224 as a third drive source that drives the feeding unit 5 including the feed roller as the rotating member, the conveyance drive motor 225 that drives the conveyance unit including the registration roller 6 as the rotating member, and the like. The feeding unit 5 and the conveyance unit are units serving to convey the sheet S.

Control for manually feeding the sheet S is also performed by the feed drive control board 220. The manual feed drive unit 104 includes a manual feed drive motor 226 that drives the manual feeding unit 12 including the manual feed roller as the rotating member, and a sheet type detection sensor 227 as a detection portion that detects the type of the sheet S. The manual feed drive motor 226 is connected to the ASIC 229 of the feed drive control board 220 and controlled. The sheet type detection sensor 227 is connected to the CPU 112 of the system controller board 111.

As described above, the system controller board 111 that integrally controls the entire apparatus and the main drive control board 201 that controls a device that serves to perform image formation perform coordinated control at the same timing, whereby image formation is performed.

Figure 3:
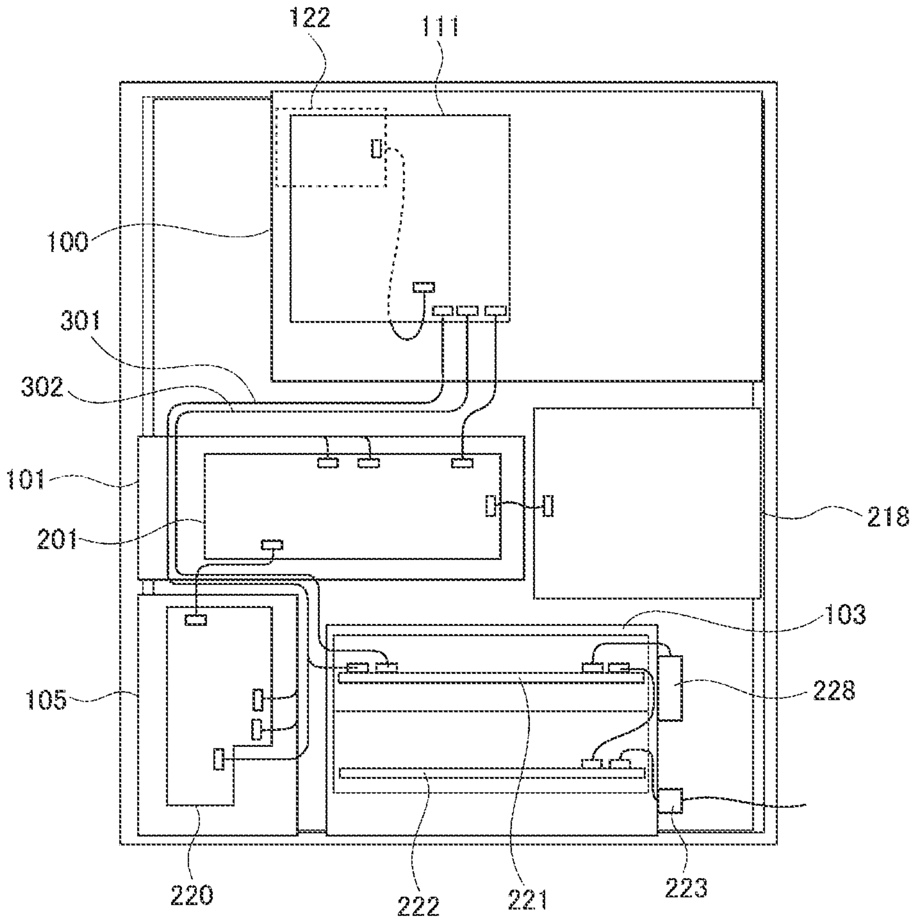
FIG. 3 is a diagram illustrating an electrical arrangement configuration of a main drive unit according to a first comparative example.

Next, an electrical arrangement configuration of the main drive unit according to the present embodiment will be described in comparison with a configuration according to a comparative example with reference to FIGS. 3 and 4. FIG. 3 is a diagram illustrating an electrical arrangement configuration of a main drive unit according to a first comparative example. FIG. 4 is a diagram illustrating the electrical arrangement configuration of the main drive unit according to the first embodiment.

First, a board arrangement configuration on the back surface side of the image forming apparatus 1 will be described.

The image forming apparatus 1 illustrated in FIGS. 3 and 4 includes the main drive unit 101 and the main drive control board 201 that controls the main drive unit 101. The main drive unit 101 is detachably attached to the back surface side of the image forming apparatus 1. The main drive control board 201 is disposed on a back surface side of the main drive unit 101.

The image forming apparatus 1 further includes the system controller board 111, and the DC power supply board 221 and the AC power supply board 222 as power supply boards. The system controller board 111 is disposed on one side (here, an upper side) of the main drive control board 201 in the vertical direction that is a first direction on the back surface side of the image forming apparatus 1. The DC power supply board 221 and the AC power supply board 222 are disposed on the other side (here, a lower side) of the main drive control board 201 in the vertical direction that is the first direction on the back surface side of the image forming apparatus 1.

In other words, the main drive control board 201 is disposed between the system controller board 111, and the AC power supply board 222 and the DC power supply board 221 on the back surface side of the image forming apparatus 1.

In the configuration according to the first comparative example illustrated in FIG. 3, a control line 301 and a power supply line 302, which are cables electrically connected to the above-described DC power supply board 221, are routed in such a way as to traverse the main drive unit 101, and are directly connected to the system controller board 111.

Here, a configuration in which a control line (signal line) for transmitting a signal and a power supply line for supplying power are provided as cables for electrically connecting the boards, and the control line and the power supply line are separately provided is exemplified. However, the cable for electrically connecting the boards is not limited thereto. For example, the cable may be a bundle of control lines and power supply lines.

In the configuration according to the first comparative example illustrated in FIG. 3, when removing the main drive unit 101 that is a maintenance target from the image forming apparatus 1, it is necessary to remove the cable from a connector of the system controller board 111 or the DC power supply board 221 that is not a maintenance target. Then, it is necessary to access the main drive unit 101 while keeping the cable (the bundle of wires) away from the main drive unit 101. For this reason, it is necessary to access units other than the main drive unit 101 that is a maintenance target to remove the control line 301 and the power supply line 302, which are cables, as a result of which workability at the time of maintenance deteriorates.

On the other hand, in the configuration according to the present embodiment illustrated in FIG. 4, in a case where an electric path straddling a unit is generated, a configuration is adopted in which a bundle of wires is divided at an inlet and an outlet of the unit to facilitate detachment of the unit.

Specifically, the system controller board 111 includes connectors 111*a* and 111*b* that electrically connect cables, and a controller-side control line 403 and a controller-side power supply line 404, which are first cables, are connected to the connectors 111*a* and 111*b*, respectively.

The DC power supply board 221 includes connectors 221*a* and 221*b* that electrically connect cables, and a power-supply-side control line 401 and a power-supply-side power supply line 402, which are second cables, are connected to the connectors 221*a* and 221*b*, respectively.

The main drive control board 201 includes first connectors 201*a* and 201*b* that connect the control line 403 and the power supply line 404, which are the first cables electrically connected to the system controller board 111. The main drive control board 201 further includes second connectors 201*c* and 201*d* that connect the control line 401 and the power supply line 402, which are the second cables electrically connected to the DC power supply board 221. In the main drive control board 201, the second connectors 201*c* and 201*d* are electrically connected to the first connectors 201*a* and 201*b*, respectively.

More specifically, the first connectors 201*a* and 201*b* are disposed on one side (here, the upper side) of the main drive control board 201 in the vertical direction. On the other hand, the second connectors 201*c* and 201*d* are disposed on the other side (here, the lower side) of the main drive control board 201. In other words, the first connectors 201*a* and 201*b* that connect the first cables electrically connected to the system controller board 111 are disposed on a system controller board side. The second connectors 201*c* and 201*d* that connect the second cables electrically connected to the DC power supply board 221 are disposed on a DC power supply board side.

In this manner, the power-supply-side control line 401 and the power-supply-side power supply line 402, which are the second cables, are connected to the lower side of the main drive control board 201 in the vertical direction. The control line and the power supply line connected to the lower side of the main drive control board 201 are wired in the board, and are output again as the controller-side control line 403 and the controller-side power supply line 404, which are the first cables, from the upper side of the main drive control board 201 in the vertical direction. In other words, the second connectors 201*c* and 201*d* are electrically connected to the first connectors 201*a* and 201*b*, respectively, on the main drive control board 201. The controller-side control line 403 and the controller-side power supply line 404 are connected to the system controller board 111.

Therefore, in the present embodiment, power is supplied from the DC power supply board 221 to the system controller board 111 via the main drive control board 201.

By adopting such a connection configuration, it is possible to eliminate a cable that straddles a unit (main drive unit 101) disposed between boards. When detaching the main drive unit 101 that is a maintenance target from the image forming apparatus 1, it is only necessary to detach the cable from the main drive control board 201 disposed in the main drive unit 101 that is a maintenance target. In other words, it is not necessary to access a unit that is not a maintenance target when detaching a unit that is a maintenance target. As a result, it is possible to improve workability when attaching and detaching the main drive unit 101 including the main drive control board 201 to and from the image forming apparatus 1.

The main drive control board 201 is disposed on the back surface side of the main drive unit 101. The first connectors 201*a* and 201*b* are disposed on a surface of the main drive control board 201 that is opposite to a surface facing the main drive unit 101. The second connectors 201*c* and 201*d* are disposed on the same surface of the main drive control board 201 as the surface on which the first connectors 201*a* and 201*b* are disposed. Accordingly, workability at the time of maintenance can be improved.

As described above, according to the present embodiment, in a case of detaching a unit as a maintenance target disposed between boards from the image forming apparatus, the unit can be detached by detaching a cable from a board disposed in the unit. Accordingly, it is possible to improve workability when attaching and detaching the main drive unit 101 including the main drive control board 201 to and from the image forming apparatus 1.

Second Embodiment

Next, an image forming apparatus according to a second embodiment will be described. Since a schematic configuration of the image forming apparatus is substantially similar to that of the above-described embodiment, members having equivalent functions are denoted by the same reference numerals, and a description thereof will be omitted.

Figure 5:
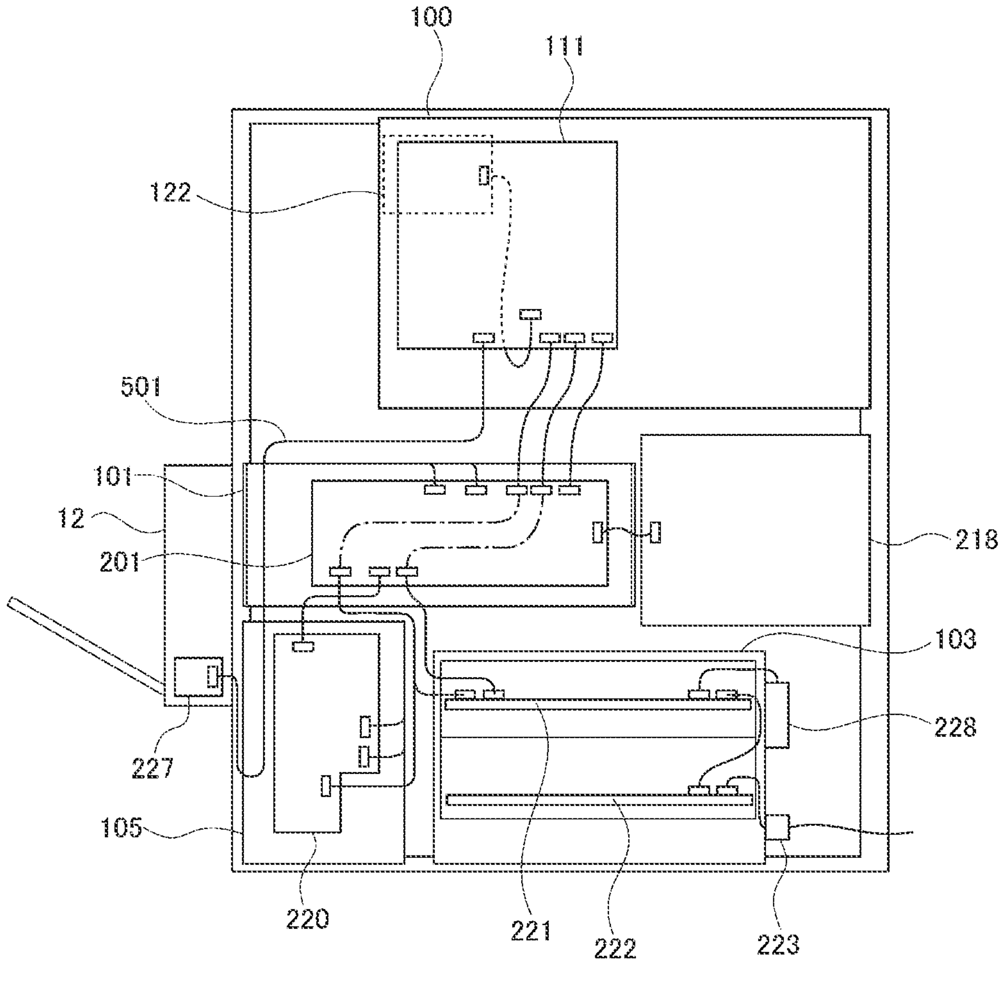
FIG. 5 is a diagram illustrating an electrical arrangement configuration of a feed drive unit according to a second comparative example.

Here, an electrical arrangement configuration of a main drive unit of the present embodiment will be described in comparison with a configuration according to a comparative example with reference to FIGS. 5 and 6. FIG. 5 is a diagram illustrating an electrical arrangement configuration of a main drive unit according to a second comparative example. FIG. 6 is a diagram illustrating the electrical arrangement configuration of the main drive unit according to the second embodiment.

First, a board arrangement configuration on the back surface side of the image forming apparatus 1 will be described.

Similarly to the image forming apparatus illustrated in FIGS. 3 and 4, an image forming apparatus 1 illustrated in FIGS. 5 and 6 includes a main drive unit 101 and a main drive control board 201 that controls the main drive unit 101. The image forming apparatus 1 further includes the system controller board 111, and the DC power supply board 221 and the AC power supply board 222 as power supply boards. Since an arrangement configuration thereof is similar to that of the above-described embodiment, a description thereof will be omitted here.

In the image forming apparatus 1 illustrated in FIGS. 5 and 6, a manual feed drive unit 104 that drives a manual feeding unit 12 is connected and arranged in addition to the image forming apparatus illustrated in FIGS. 3 and 4. A sheet type detection sensor 227 for determining the type of a sheet S set on a manual feed tray 11 is incorporated in the manual feed drive unit 104. That is, the image forming apparatus 1 illustrated in FIGS. 5 and 6 includes the sheet type detection sensor 227 that is a detection portion for detecting the sheet S as a recording material. The sheet type detection sensor 227 is disposed on the other side (here, a lower side) of the main drive control board 201 in the vertical direction that is the first direction on the back surface side of the image forming apparatus 1.

In other words, the main drive control board 201 is disposed between the system controller board 111 and the sheet type detection sensor 227 on the back surface side of the image forming apparatus 1.

The image forming apparatus 1 according to the present embodiment includes, as drive units, the main drive unit 101 that is a first drive unit, and a feed drive unit 105 that is a second drive unit. The feed drive unit 105 is detachably attachable to the back surface side of the image forming apparatus 1 on the other side (here, the lower side) of the main drive unit 101 in the vertical direction that is the first direction.

In addition, the image forming apparatus 1 according to the present embodiment includes, as drive control boards, the main drive control board 201 that is a first drive control board, and a feed drive control board 220 that is a second drive control board. The feed drive control board 220 is disposed on a back surface side of the feed drive unit 105 and controls the feed drive unit 105.

In the present embodiment, a configuration including the main drive unit 101 and the feed drive unit 105 as the drive units has been exemplified, but the present disclosure is not limited thereto, and a configuration including one of the drive units may be adopted. In this case, the drive control board that controls the drive unit also includes one drive control board.

In the configuration according to the second comparative example illustrated in FIG. 5, a sensor signal line 501, which is a cable electrically connected to the sheet type detection sensor 227, is routed in such a way as to traverse the feed drive unit 105 and the main drive unit 101 and is directly connected to the system controller board 111. Therefore, information detected by the sheet type detection sensor 227 is transmitted to the system controller board 111 through the sensor signal line 501, and a CPU in the system controller board 111 executes data processing to determine the sheet type.

In the configuration according to the second comparative example illustrated in FIG. 5, when removing the feed drive unit 105 or main drive unit 101 that is a maintenance target from the image forming apparatus 1, it is necessary to remove a cable from the system controller board 111 or the manual feeding unit 12 that is not a maintenance target. Then, it is necessary to access the main drive unit 101 while keeping the cable (the bundle of wires) away from the feed drive unit 105 and the main drive unit 101. For this reason, it is necessary to access units other than the feed drive unit 105 or main drive unit 101 that is a maintenance target to remove the sensor signal line 501, as a result of which workability at the time of maintenance deteriorates.

On the other hand, in the configuration according to the present embodiment illustrated in FIG. 6, in a case where an electric path straddling a unit is generated, a configuration is adopted in which a bundle of wires is divided at an inlet and an outlet of the unit to facilitate detachment of the unit.

Specifically, the image forming apparatus 1 illustrated in FIG. 6 has the following configuration in addition to the configuration of the image forming apparatus 1 illustrated in FIG. 4.

The system controller board 111 includes a connector 111*c* that electrically connects a cable, and a controller-side control line 603 that is the first cable is connected to the connector 111*c*.

The main drive control board 201 includes a first connector 201*e* that connects the controller-side control line 603 that is the first cable electrically connected to the system controller board 111. Furthermore, the main drive control board 201 includes a second connector 201*f* that connects a feed-side control line 602 that is an intermediate cable. In the main drive control board 201, the second connector 201*f* is electrically connected to the first connector 201*e*.

More specifically, the first connector 201*e* is disposed on one side (here, an upper side) of the main drive control board 201 in the vertical direction. On the other hand, the second connector 201*f* is disposed on the other side (here, the lower side) of the main drive control board 201. In other words, the first connector 201*e* that connects the controller-side control line 603 that is the first cable electrically connected to the system controller board 111 is disposed on a system controller board side. The second connector 201*f* that connects the feed-side control line 602 that is the intermediate cable electrically connected to the feed drive control board 220 is disposed on a feed drive control board side.

The feed drive control board 220 includes a first connector 220*b* that connects the feed-side control line 602 that is the intermediate cable electrically connected to the main drive control board 201. Furthermore, the feed drive control board 220 includes a second connector 220*a* that connects a manual-feed-side sensor signal line 601 that is the second cable electrically connected to the sheet type detection sensor 227 incorporated in the manual feeding unit 12. In the feed drive control board 220, the second connector 220*a* is electrically connected to the first connector 220*b*.

More specifically, the second connector 220*a* is disposed on a right side of the feed drive control board 220 in a left-right direction. In addition, the second connector 220*a* is disposed lower than the first connector 220*b* in the vertical direction on the feed drive control board 220. That is, the second connector 220*a* is disposed on a manual feeding unit side of the feed drive control board 220. The first connector 220*b* is disposed on an upper side of the feed drive control board 220 in the vertical direction. That is, the first connector 220*b* is disposed on a main drive control board side of the feed drive control board 220.

The second connector 220*a* and the first connector 220*b* included in the feed drive control board 220 are electrically connected in the feed drive control board 220. That is, the manual-feed-side sensor signal line 601 connected to the lower side (right side) of the feed drive control board 220 is wired in the board, and is output again as the feed-side control line 602 from above the feed drive control board 220 in the vertical direction. Therefore, a detection signal of the sheet type detection sensor 227 is output to the main drive control board 201 integrally with a control signal between the main drive control board 201 and the feed drive control board 220.

In this manner, the feed-side control line 602 is connected to the lower side of the main drive control board 201 in the vertical direction. The feed-side control line 602 connected to the lower side of the main drive control board 201 is wired in the board, and is output again as the controller-side control line 603 from above the main drive control board 201 in the vertical direction. The controller-side control line 603 is connected to the system controller board 111. A detection signal of the sheet type detection sensor 227 is output to the system controller board 111 integrally with a control signal between the main drive control board 201 and the system controller board 111.

Therefore, in the present embodiment, a signal is transmitted from the sheet type detection sensor 227 to the system controller board 111 via the feed drive control board 220 and the main drive control board 201.

By adopting such a connection configuration, it is possible to eliminate a cable that straddles a unit (the main drive unit 101 or feed drive unit 105) disposed between boards. When detaching the main drive unit 101 or feed drive unit 105 that is a maintenance target from the image forming apparatus 1, it is only necessary to detach the cable from the main drive control board 201 disposed in the main drive unit 101 that is a maintenance target. Alternatively, it is only necessary to detach the cable from the feed drive control board 220 disposed in the feed drive unit 105 that is a maintenance target. In other words, it is not necessary to access a unit that is not a maintenance target when detaching a unit that is a maintenance target. As a result, it is possible to improve workability when attaching and detaching the main drive unit 101 including the main drive control board 201 to and from the image forming apparatus 1. In addition, it is possible to improve workability when attaching and detaching the feed drive unit 105 including the feed drive control board 220 to and from the image forming apparatus 1.

Other Embodiments

In the first embodiment, the vertical direction is exemplified as the first direction in the configuration in which the main drive control board is disposed between the system controller board and the power supply board. In addition, the configuration in which the system controller board is disposed on the upper side of the main drive control board in the vertical direction and the power supply board is disposed on the lower side of the main drive control board in the vertical direction has been exemplified. However, the present disclosure is not limited thereto. For example, the system controller board may be disposed on the lower side of the main drive control board in the vertical direction and the power supply board may be disposed on the upper side of the main drive control board in the vertical direction. For example, the first direction may be the left-right direction, and the system controller board may be disposed on one side of the main drive control board in the left-right direction and the power supply board may be disposed on the other side of the main drive control board in the left-right direction. Alternatively, the first direction may be an oblique direction in which the vertical direction and the left-right direction are combined, and the system controller board may be disposed on one side (for example, an upper right side) of the main drive control board in the oblique direction and the power supply board may be disposed on the other side (for example, a lower left side) of the main drive control board in the horizontal direction. Even with such an arrangement configuration, a similar effect can be obtained by applying the present disclosure.

Further, in the above-described embodiments, the copying machine has been described as an example of the image forming apparatus, but the present disclosure is not limited thereto. For example, another image forming apparatus such as a printer or a facsimile machine, or another image forming apparatus such as a multifunction peripheral in which these functions are combined may be used. In addition, the image forming apparatus has been exemplified in which the intermediate transfer member is used, toner images of respective colors are transferred to the intermediate transfer member in a sequentially superimposed manner, and the toner images carried on the intermediate transfer member are collectively transferred to the recording material, but the present disclosure is not limited thereto. The image forming apparatus may be an image forming apparatus that uses a recording material carrier and transfers toner images of respective colors in a sequentially superimposed manner on the recording material carried on the recording material carrier. Similar effects can be obtained by applying the present disclosure to these image forming apparatuses.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-196071, filed Dec. 8, 2022, which is hereby incorporated by reference herein in its entirety.

What is claimed is:

1. An image forming apparatus comprising:

a drive unit detachably attached to the image forming apparatus;

a drive control board disposed on a back surface side of the drive unit and configured to control the drive unit;

a first unit;

a second unit;

a first cable configured to electrically connect the first unit and the drive control board; and a second cable configured to electrically connect the second unit and the drive control board, wherein the drive control board includes:

a first connector to which the first cable is connected, a second connector to which the second cable is connected, and a wiring configured to electrically connect the first connector and the second connector, wherein the first unit includes a detection portion configured to detect a recording material, the second unit includes a controller board configured to integrally control the image forming apparatus, and a signal is transmitted from the detection portion to the controller board via the first cable, the wiring, and the second cable.

2. The image forming apparatus according to claim 1, wherein the first unit includes a power supply board configured to supply power, wherein the second unit includes a controller board configured to integrally control the image forming apparatus, and wherein power is supplied from the power supply board to the controller board via the first cable, the wiring, and the second cable.

3. The image forming apparatus according to claim 1, further comprising a conveyance portion configured to convey the recording material, wherein the drive unit includes a motor configured to drive the conveyance portion, and the drive control board controls an operation of the motor.

4. The image forming apparatus according to claim 1, wherein the drive control board is disposed between the first unit and the second unit.

5. The image forming apparatus according to claim 1, wherein the first connector is disposed along an edge of the drive control board that is adjacent to the first unit, and the second connector is disposed along an edge of the drive control board that is adjacent to the second unit.

6. The image forming apparatus according to claim 1, wherein the drive control board has a first surface facing the drive unit and a second surface opposite to the first surface, and the first connector and the second connector are disposed on the second surface.

7. The image forming apparatus according to claim 1, wherein the drive unit includes a motor configured to drive a rotating member, and the drive control board controls an operation of the motor.

8. The image forming apparatus according to claim 1, further comprising:

a photoreceptor; and a developing portion configured to develop a latent image formed on the photoreceptor, wherein the drive unit includes a first motor configured to drive the photoreceptor and a second motor configured to drive the developing portion, and the drive control board is configured to control an operation of the first motor and an operation of the second motor.

* * * * *